(12) United States Patent
Antony et al.

(10) Patent No.: US 10,275,328 B2
(45) Date of Patent: Apr. 30, 2019

(54) FAULT TOLERANCE FOR HYBRID CLOUD DEPLOYMENTS

(71) Applicant: VMWARE, INC., Palo Alto, CA (US)

(72) Inventors: Jinto Antony, Bangalore (IN); Madhusudhanan Gangadharan, Bangalore (IN); Sudhish P. T., Bangalore (IN); Sreekanth Pillalamarri, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 381 days.

(21) Appl. No.: 14/791,275

(22) Filed: Jul. 3, 2015

(65) Prior Publication Data
US 2016/0292053 A1   Oct. 6, 2016

(30) Foreign Application Priority Data

Apr. 2, 2015 (IN) .............................. 1768/CHE/2015

(51) Int. Cl.
| | |
|---|---|
| *G06F 15/16* | (2006.01) |
| *G06F 11/20* | (2006.01) |
| *G06F 21/57* | (2013.01) |
| *H04L 12/24* | (2006.01) |
| *G06F 11/14* | (2006.01) |
| *H04L 29/08* | (2006.01) |
| *G06F 9/00* | (2006.01) |
| *H04L 29/12* | (2006.01) |
| *H04L 29/14* | (2006.01) |

(52) U.S. Cl.
CPC ............ *G06F 11/203* (2013.01); *G06F 9/00* (2013.01); *G06F 11/1451* (2013.01); *G06F 21/577* (2013.01); *H04L 41/08* (2013.01); *H04L 67/1002* (2013.01); *H04L 67/1095* (2013.01); *H04L 67/2842* (2013.01); *G06F 2201/805* (2013.01); *H04L 61/1511* (2013.01); *H04L 61/2076* (2013.01); *H04L 61/2582* (2013.01); *H04L 67/1034* (2013.01); *H04L 69/40* (2013.01)

(58) Field of Classification Search
CPC ............ G06F 11/1451; G06F 11/1469; G06F 21/577; H04L 41/0846
USPC ........................................ 709/220, 224, 242
See application file for complete search history.

(56) References Cited

U.S. PATENT DOCUMENTS

| | | | | |
|---|---|---|---|---|
| 2010/0125903 | A1* | 5/2010 | Devarajan ............. | G06F 21/577 726/15 |
| 2012/0310887 | A1* | 12/2012 | Taranov ............... | G06F 11/2028 707/634 |
| 2013/0198557 | A1* | 8/2013 | Bensinger ........... | G06F 11/1451 714/3 |
| 2013/0262390 | A1* | 10/2013 | Kumarasamy ...... | H04L 41/0846 707/649 |

* cited by examiner

*Primary Examiner* — Kyung H Shin
(74) *Attorney, Agent, or Firm* — Loza & Loza, LLP

(57) ABSTRACT

A technique for providing fault tolerance for virtual machines in a hybrid cloud computing system is discussed. When a primary virtual machine (VM) in a private data center is configured for fault tolerance, a secondary VM is instantiated in a public cloud computing system. Changes to the execution state of the primary VM are recorded and relayed to the secondary VM by way of caching modules, which provide acknowledgements messages back to the primary VM. A technique for failback from the public cloud computing system to the private data center is also discussed.

20 Claims, 4 Drawing Sheets

FAULT TOLERANCE FOR HYBRID CLOUD DEPLOYMENTS

RELATED APPLICATIONS

Benefit is claimed under 35 U.S.C. 119(a)-(d) to Foreign application Serial No. 1768/CHE/2015 filed in India entitled "FAULT TOLERANCE FOR HYBRID CLOUD DEPLOYMENTS", on Apr. 2, 2015, by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. The use of such public cloud services is typically kept separate from the use of existing computing resources in data centers managed by an enterprise. With an increasing trend in migrating data centers to cloud platforms, there is an increasing demand for a hybrid model of maintaining a primary on-premise data center and using a cloud platform as a standby for backup and disaster recovery purposes.

SUMMARY

Embodiments of the present disclosure provide a system, computer-readable storage medium having instructions for, and a method for managing a hybrid cloud computing system. The method includes instantiating a secondary virtual machine in a public cloud computing system. The secondary virtual machine has an execution state corresponding to a primary virtual machine in a private data center. The method further includes receiving changes to the execution state of the primary virtual machine from a first caching module in the private data center, and updating state data and a virtual disk of the secondary virtual machine according to the received changes to the execution state of the primary virtual machine.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
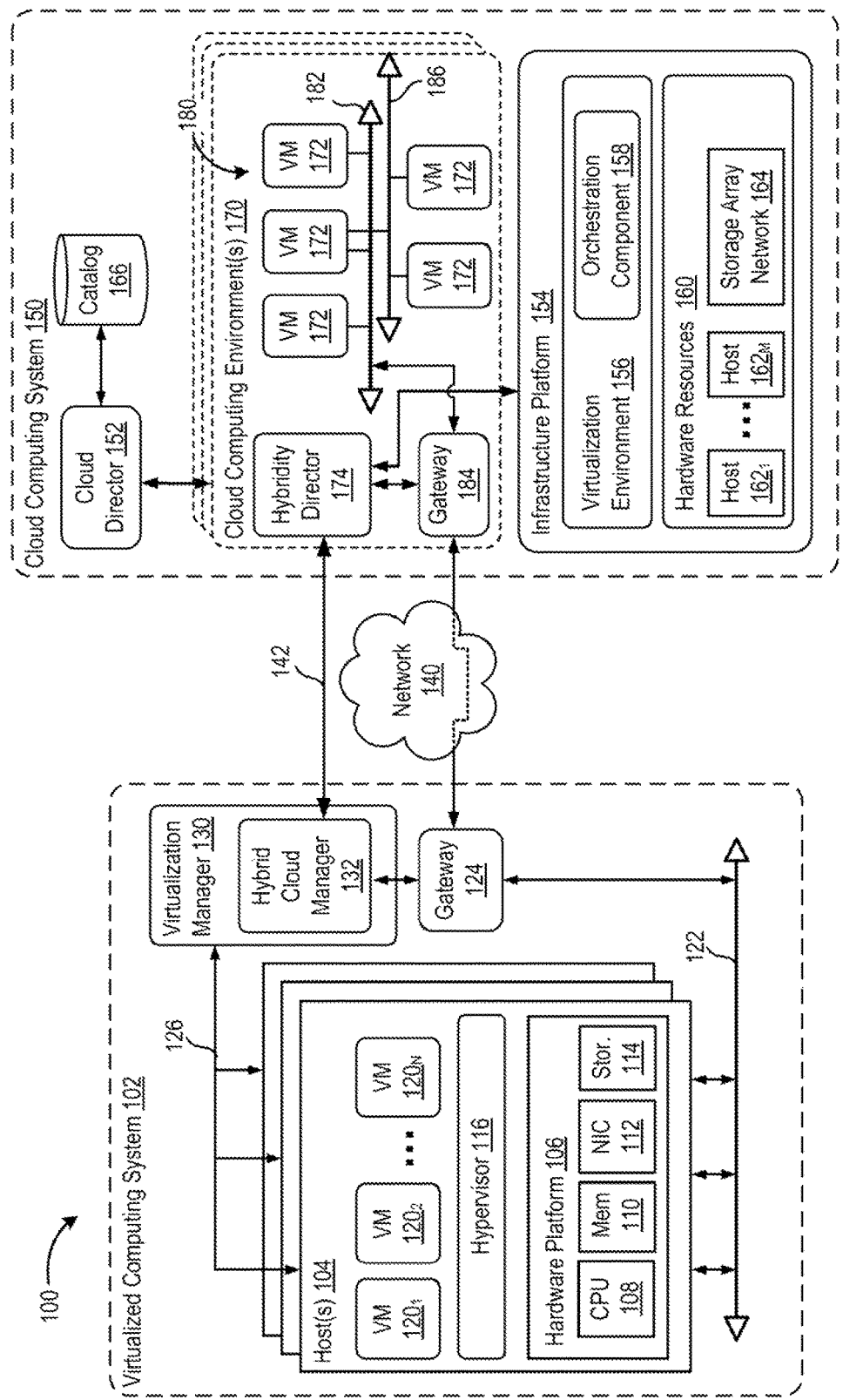
FIG. 1 is a block diagram that illustrates a computer system in which one or more embodiments may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2(L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

FIGS. 2A to 2D are block diagrams depicting disaster recovery operations of a hybrid cloud computing system 200, according to one embodiment of the present disclosure. Hybrid cloud computing system 200 is configured to provide a common platform for executing virtual workloads seamlessly between a private data center 202, which may be configured similarly to virtualized computing system 102, and a public cloud computing system 250, which may be configured similarly to cloud computing system 150 in FIG. 1. Private data center 202 may be managed by an enterprise (first organization), and the enterprise may be a tenant in public cloud computing system 250, which is managed by a cloud provider (second organization). For example, a virtual data center 220 within public cloud computing system 250 may be allocated to the enterprise as one tenant, while other virtual data centers having VMs associated other tenants (not shown) may be allocated within public cloud computing system 250.

In one or more embodiments, hybrid cloud manager 132 and hybridity director 174 are configured to provide fault tolerance (FT) (also referred to as high availability, or redundancy) capabilities to VMs 120 executing within hybrid cloud computing system. In operation, hybrid cloud manager 132 and hybridity director 174 (e.g., in response to user input) can create a secondary VM 206 within public cloud computing system 250 that corresponds to a primary VM 204 executing within private data center 202. Secondary VM 206 is configured to run in virtual lockstep with primary VM 204, i.e., secondary VM executes the same sequence of virtual (guest) instructions as primary VM 204. As such, secondary VM 206 is able to take over for primary VM 204 at any time without any data loss or interruption of service should primary VM 204 fail.

Figure 2A:
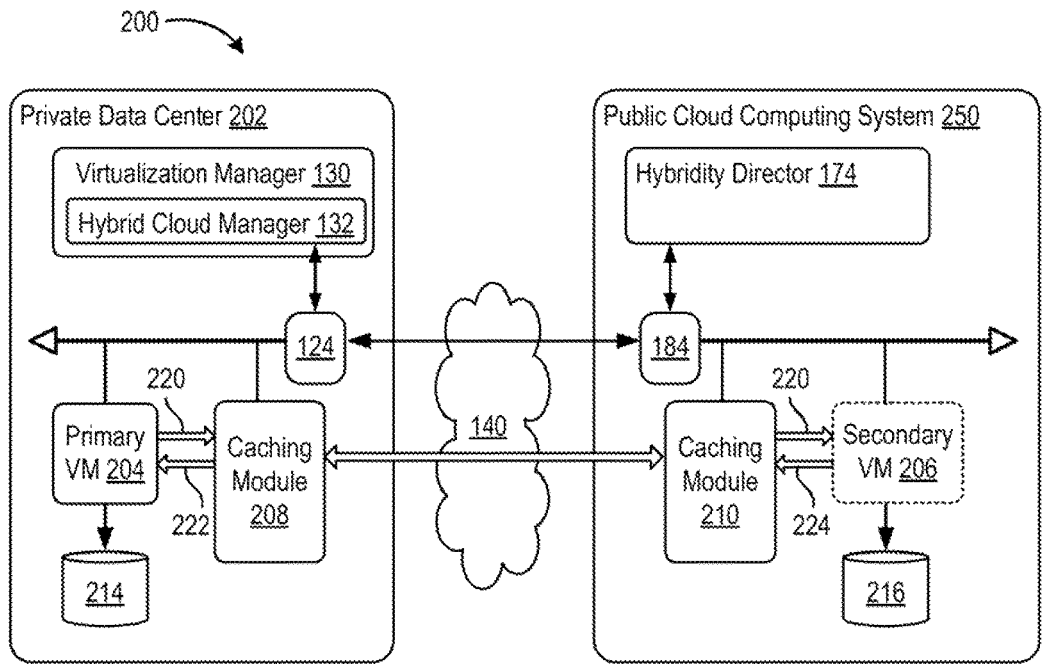
FIGS. 2A to 2D are block diagrams depicting disaster recovery operations of a hybrid cloud computing system, according to one embodiment of the present disclosure.

As shown in FIG. 2A, to provide fault tolerance, primary VM 204 may use a "record/replay"-type mechanism wherein primary VM 204 (e.g., by operation of a hypervisor) captures or "records" nondeterministic behavior, such as events received from a virtual network interface cards (vNIC), network packets sent to primary VM 204, user inputs, and CPU timer events, from within the virtual processor as well as from virtual I/O devices. The captured non-deterministic events are logged and sent across via network 140 to secondary VM 206, and secondary VM 206 executes (i.e., "replays") the same series of instructions as primary VM 204. Because both primary and secondary VMs 204, 206 execute the same guest instruction sequence, both VMs initiate (same) I/O operations. However, only the entire output of primary VM 204 takes effect: network packets may be transmitted from primary VM 204, disk writes from primary VM 204 may be committed to a virtual disk 214, and so forth. In contrast, some output activity of secondary VM 206 is suppressed by virtualization environment 156

(e.g., hypervisor). For example, network packets to be transmitted from secondary VM 206 are instead discarded.

According to one or more embodiments, secondary VM includes an additional, separate virtual disk 216, which corresponds to virtual disk 214, and to which output from secondary VM 206 (e.g., disk writes) are written and to which changes in execution state and configuration of secondary VM 206 may be persisted. In contrast to conventional approaches that require a primary and secondary VM to share a same virtual disk, embodiments of the present disclosure utilize an additional virtual disk 216 located at public cloud computing system 250 to which secondary VM 206 is allowed to write. This facilitates ensuring that the virtual disks 214, 216 are in sync between the different sites, i.e., private data center 202 and public cloud computing system 250, without spending additional bandwidth for synchronizing virtual disk files.

According to one or more embodiments, private data center 202 includes a caching module 208 configured to relay the logged non-deterministic events (depicted as logging traffic 220) from primary VM 204 to secondary VM 206. In the embodiment shown, caching module 208 may be implemented as an appliance VM executing within private data center 202 and dedicated to the described functionality, although other implementation may be used. Caching module 208 is configured to transmit acknowledgements 222 to primary VM 204 in response to receiving logging traffic 220. To ensure the integrity of the record/replay mechanism, primary VM 204 commits to any new non-deterministic events (e.g., network transmissions, disk writes) only after receiving acknowledgements 222 (from caching module 208) that all logged events preceding the new event have been received. Caching module 208 advantageously reduces latency and performance issues that might otherwise result if primary VM 204 had to wait until acknowledgements returned all the way from secondary VM 206 residing in public cloud computing system 250.

Caching module 210 within public cloud computing system is configured to transmit logging traffic 220 to secondary VM 206 for replay. Caching module 210 may be configured to dole out portions of logging traffic 220 as acknowledgements 224 are received from secondary VM 206, such that caching module 210 behaves as if primary VM 204 were in the same site as secondary VM 206.

Figure 2B:
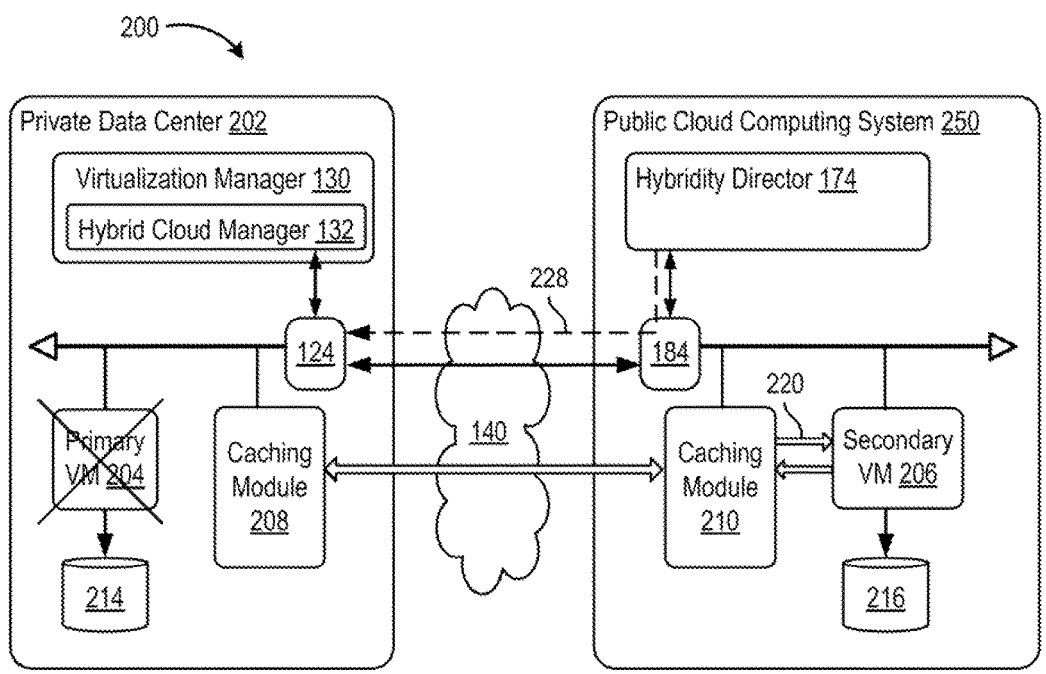

Should a failure of primary VM 204 occur, as depicted in FIG. 2B, the remaining, pending logging traffic 220 that is stored within caching modules 208, 210 is flushed and transported to secondary VM 206. Secondary VM 206 is configured to replay the remaining logging traffic, thereby bringing the execution state in secondary VM 206 to exact synchronization with primary VM 204 at the point of primary VM's failure. Hybridity director 174 is configured to modify network configurations of gateways 124, 184 to route network traffic intended for the now-failed primary VM 204 to instead reach secondary VM 206 (as depicted by arrow 228). In one embodiment, hybridity director 174 may create a new network address translation (NAT) entry in on-premise gateway 124 within private data center 202 that specifies the network address of secondary VM 206. In another embodiment, hybridity director 174 may use dynamic domain name services (DDNS) for client applications to reach secondary VM 206. As such, the new NAT entry handles users connecting from within the on-premise private data center 202, and the DDNS changes handle users connecting from the Internet or outside of on-premise private data center 202.

Figure 2C:
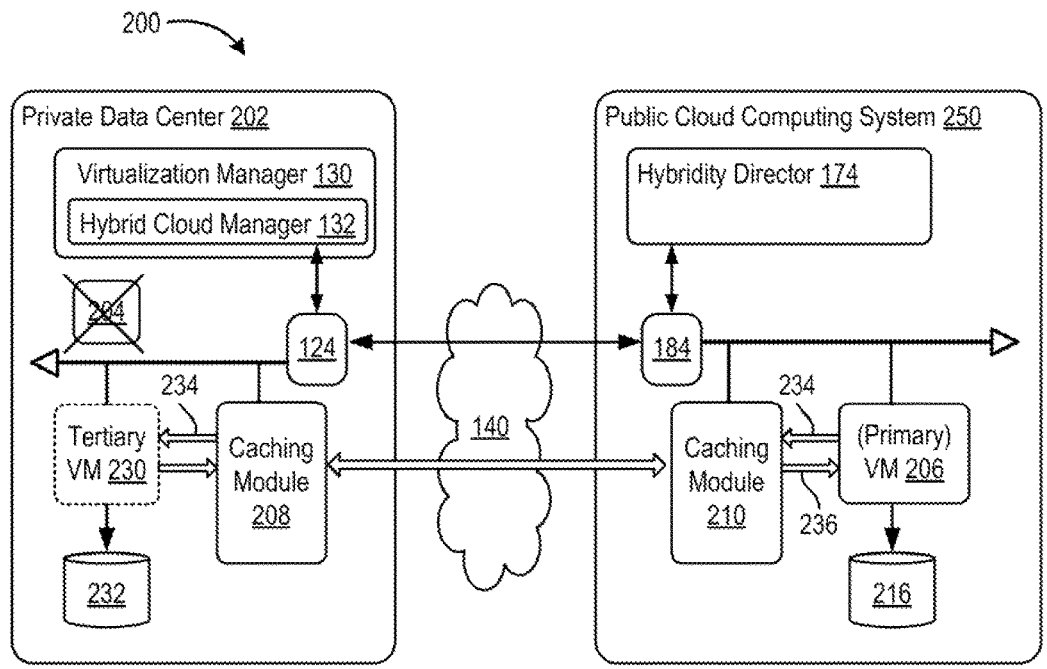
Figure 2D:
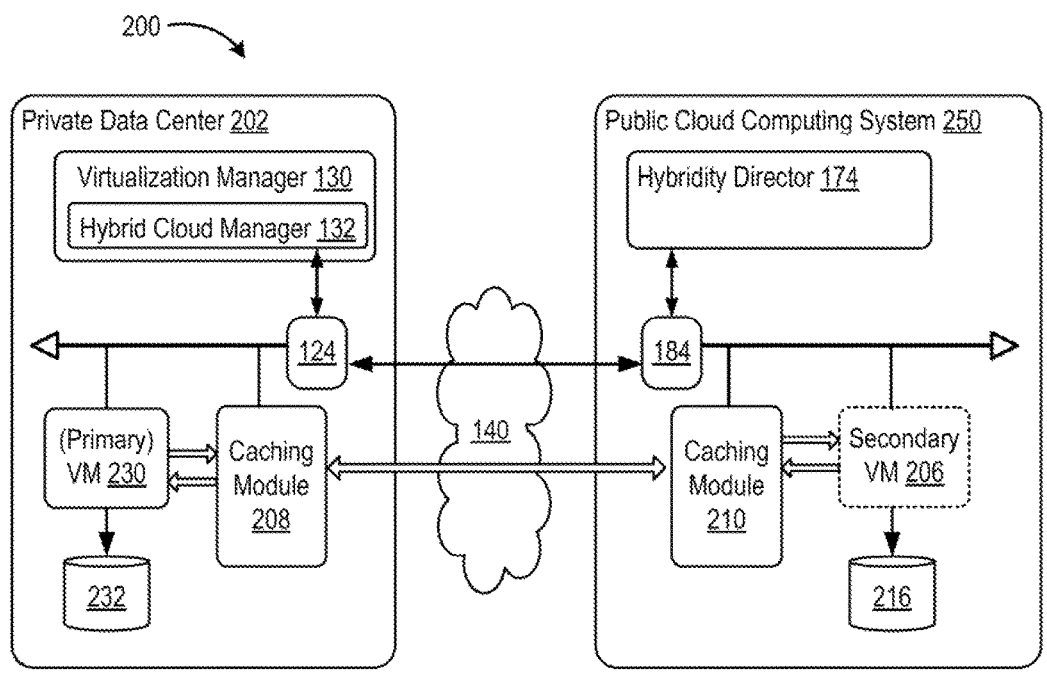

Embodiments of the present disclosure may be configured to provide a "failback" mechanism between public cloud computing system 250 and private data center 202. As depicted in FIG. 2C, after promoting VM 206 in public cloud computing system 250 as the new primary VM, virtualization manager 130 creates a tertiary VM 230 and associated virtual disk 232 within the on-premise private data center 202. Tertiary VM 230 is essentially a new secondary VM. Tertiary VM 230 is synchronized with the execution state of new primary VM 206 using the record/replay mechanism described above, except logging traffic 234 now flows from public cloud computing system 250 to private data center 202, and acknowledgements 236, vice versa. Once the synchronization is complete, the new secondary VM 230 has moved to the same execution state as primary VM 206. As depicted in FIG. 2D. VM 230 can be automatically promoted to become the new primary VM (i.e., "failed back"), and VM 206 is re-characterized as a secondary VM, thereby returning the primary operating VM to private data center 202.

Figure 3:
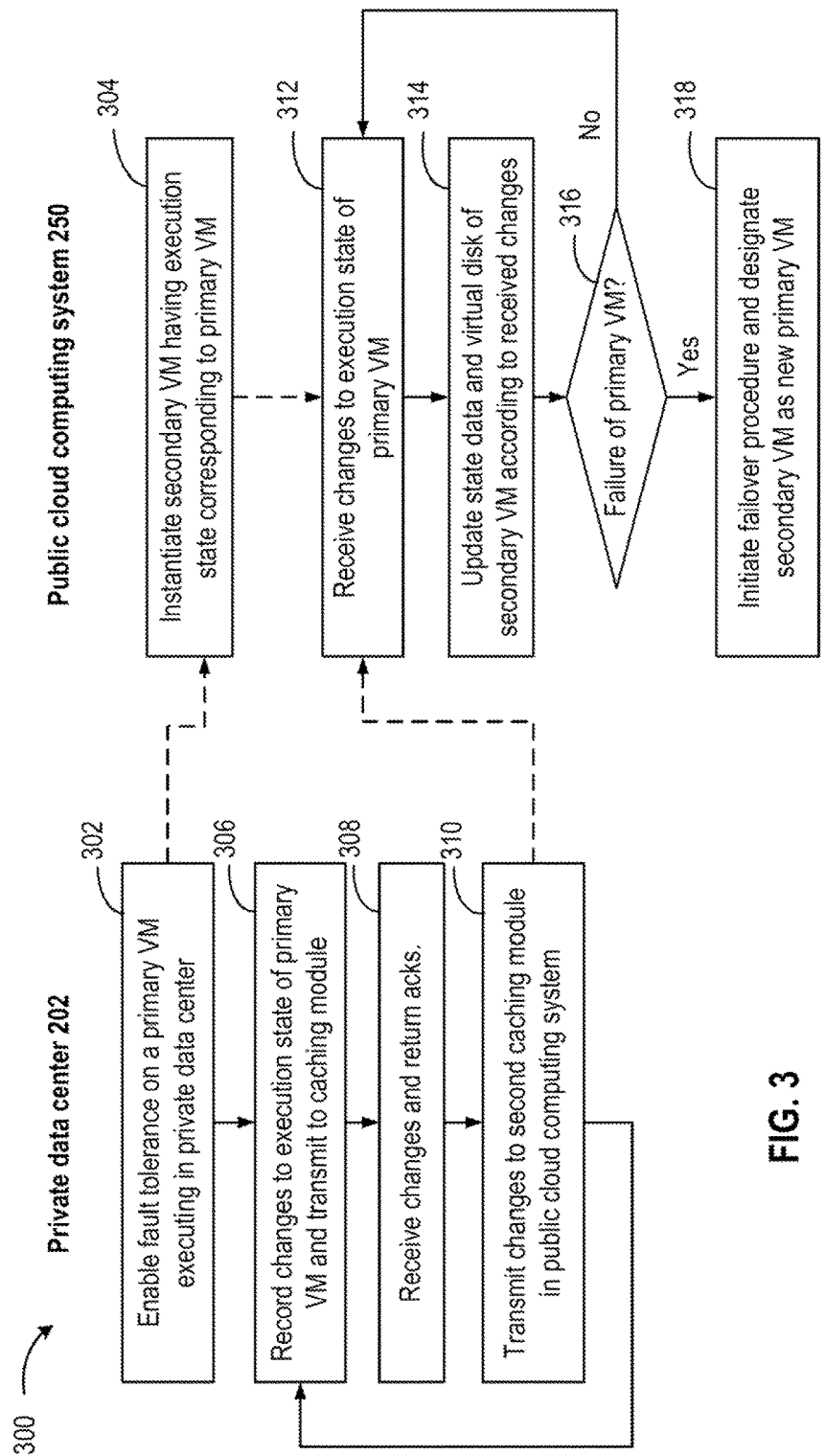
FIG. 3 is a flow diagram depicting a method for managing a hybrid cloud computing system, according to one embodiment of the present disclosure.

FIG. 3 is a flow diagram depicting a method 300 for managing a hybrid cloud computing system, according to one embodiment of the present disclosure. While method 300 is described in conjunction with components of the system shown in FIGS. 1 and 2, other components in computer systems 100 and 200 may perform the steps of method 300, as well as other systems may perform the described method. Method 300 begins at step 302, where virtualization manager 130 (e.g., in response to user input) enables fault tolerance on a VM executing within private data center 202. That VM is designated as a "primary" VM.

At step 304, responsive to receiving a request to enable fault tolerance on the VM in private data center 202, hybridity director 174 instantiates a secondary VM in public cloud computing system 250. In one implementation, hybridity director 174 selects one of hosts 162 that is compatible for hosting a secondary VM—that is, having a hardware profile compatible with the host (host 104) upon which the primary VM executes, and creates the secondary VM on the selected host. The secondary VM is configured to have an execution state corresponding to the primary VM in private data center 202. In some embodiments, the secondary VM may be cloned from the primary VM, which initializes the execution state of the secondary VM to be identical to the execution state of the primary VM. That is, the memory contents of the primary VM is live-migrated to public cloud computing system 250, virtual disk 214 of the primary VM is copied to the public cloud computing system 250, and the secondary VM is launched and running.

At step 306, hypervisor 116, on which the primary VM executes, records changes to the execution state of the primary VM during the primary VM's operation. The changes to execution state may include guest virtual instructions executed by the primary VM. The changes to execution state may include non-deterministic events and external inputs, such as incoming network packets, mouse and keyboard inputs, disk I/O completion events, CPU timer events, etc. Hypervisor 116 records such non-deterministic inputs in a log and transmits the logged changes to a first caching module 208 in private data center 202.

At step 308, caching module 208 receives the changes from hypervisor 116 and returns an acknowledgement message to hypervisor 116. Caching module 208 transmits acknowledgements to the primary VM indicating that changes to the execution state of the primary VM have been logged. The acknowledgement messages provides confirmation to hypervisor 116 that the changes have been successfully received, and helps signal that hypervisor 116 is permitted to proceed with committing non-deterministic changes to the primary VM. Caching module 208 may store the received changes in a cache, queue, or other storage-related data structure.

At step 310, caching module 208 transmits the received changes to a second, corresponding caching module 210 in public cloud computing system 250. In one embodiment, the transmission of changes to public cloud computing system 250 may be performed asynchronously to the processes of recording changes and sending acknowledgements. That is, the recording of changes (step 306) and sending of acknowledgements (step 308) may continue without waiting for the cached changes to be successfully transmitted to public cloud computing system 250. This asynchronous handling of the cached changes improves the performance of primary VM and reduces latency caused from the primary VM waiting to the secondary VM to get in sync. As such, the steps 306 to 310 may repeat continuously during the primary VM's operation.

At step 312, second caching module 210 in public cloud computing system 250 receives the changes to the execution state of the primary VM from caching module 208 in private data center 202. In one embodiment second caching module 210 transmits the received changes to the hypervisor (e.g., virtualization environment 156) in public cloud computing system 250 controlling the execution of the secondary VM.

At step 314, the hypervisor in public cloud computing system 250 updates state data and a virtual disk 216 of the secondary VM according to the received changes to the execution state of the primary VM. In one embodiment, the hypervisor uses the received changes to replay the recorded instructions and non-deterministic events in a manner identical to the actions of the primary VM located at private data center 202. The replay of non-deterministic events may involve injecting the non-deterministic inputs at the same execution point at which the inputs occurred in the primary VM, although other techniques for updating the execution state of the VM may be utilized. In one embodiment, some of the output events generated during execution of the secondary VM may be suppressed, such as network packet transmission, while other output events, such as disk writes, may be permitted. As such, the hypervisor in public cloud computing system 250 permits updates (e.g., disk writes) of virtual disk 216 associated with the secondary VM.

At step 316, the secondary VM determines whether a failure of the primary VM in private data center 202 has occurred. In one implementation, the corresponding hypervisors on both sides may use a heartbeat mechanism whereby a loss of heartbeat messages from the primary VM signals failure to the secondary VM. It should be recognized that other techniques for detecting failure of the primary VM may be used. If the primary VM has not failed, method 300 returns to step 312, whereby the secondary VM continues to keep in sync with the primary VM by receiving and replaying changes to the execution state.

Responsive to detecting failure of the primary VM, at step 318, the hybridity director 174 initiates a failover procedure and designates the secondary VM as the new primary VM. In one embodiment, the failover procedure may include receiving the remaining changes that occurred to the execution state of the (failed) primary VM from the first caching module 208 until a point of failure of the primary VM, and updating the state data and the virtual disk of the secondary VM according to the remaining changes. In other words, caching module 208 within data center 202 empties any remaining cached logging activity 220, and transmits the logging activity 220 to the secondary VM (by way of caching module 210) for replay. Once the secondary VM has completed replay of the remaining cached logging activity 220, the secondary VM may be considered in full sync, and may be designated as the new primary VM. That is, the secondary VM may be operated in public cloud computing system 250 as a new primary VM in place of the prior primary VM. In one embodiment, hybridity director 174 may update a network routing entry in a router (e.g., gateway 124) in private data center 202 to redirect traffic to the secondary VM in public cloud computing system 250. In some embodiments, hybridity director 174 may dynamically update a domain name service (DNS) to refer to the secondary VM in public cloud computing system 250.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for managing a hybrid cloud computing system, the method comprising:
    instantiating a secondary virtual machine in a public cloud computing system by creating and running the secondary virtual machine in the public cloud computing system, the secondary virtual machine having an execution state corresponding to a primary virtual machine in a private data center;
    configuring the secondary virtual machine to run in a virtual lockstep with the primary virtual machine;
    in response to configuring the secondary virtual machine to run in a virtual lockstep with the primary virtual machine, recording changes to the execution state of the primary virtual machine;
    receiving, at the public cloud computing system, the changes to the execution state of the primary virtual machine from a first caching module in the private data center; and
    updating state data and a virtual disk of the instantiated secondary virtual machine according to the received changes to the execution state of the primary virtual machine, wherein at least a portion of output activity of the instantiated secondary virtual machine is suppressed.

2. The method of claim 1, further comprising initiating a failover operation responsive to failure of the primary virtual machine, the failover operation comprising:
    receiving remaining changes that occurred to the execution state of the primary virtual machine from the first caching module until a point of failure of the primary virtual machine;
    updating the state data and the virtual disk of the secondary virtual machine according to the remaining changes; and
    operating the secondary virtual machine in the public cloud computing system as a new primary virtual machine in place of the prior primary virtual machine.

3. The method of claim 2, further comprising:
    updating a network routing entry in a router in the private data center to redirect traffic to the secondary virtual machine in the public cloud computing system.

4. The method of claim 2, further comprising:
    dynamically updating a domain name service (DNS) to refer to the secondary virtual machine in the public cloud computing system.

5. The method of claim 2, further comprising:
    instantiating a tertiary virtual machine in the private data center, the tertiary virtual machine having an execution state corresponding to the secondary virtual machine in the public cloud computing system; and
    initiating a failback operation from the secondary virtual machine to the tertiary virtual machine.

6. The method of claim 1, wherein the first caching module transmits acknowledgements to the primary virtual machine indicating that changes to the execution state of the primary virtual machine have been logged.

7. The method of claim 1, wherein the primary virtual machine updates a virtual disk in the private data center, and the secondary virtual machine updates a second virtual disk stored in the public cloud computing system.

8. A non-transitory computer-readable storage medium comprising instructions that, when executed in a computing device, manage a hybrid cloud computing system, by performing the steps of:
    instantiating a secondary virtual machine in a public cloud computing system by creating and running the secondary virtual machine in the public cloud computing system, the secondary virtual machine having an execution state corresponding to a primary virtual machine in a private data center;
    configuring the secondary virtual machine to run in a virtual lockstep with the primary virtual machine;

in response to configuring the secondary virtual machine to run in a virtual lockstep with the primary virtual machine, recording changes to the execution state of the primary virtual machine;

receiving, at the public cloud computing system, the changes to the execution state of the primary virtual machine from a first caching module in the private data center; and updating state data and a virtual disk of the instantiated secondary virtual machine according to the received changes to the execution state of the primary virtual machine wherein at least a portion of output activity of the instantiated secondary virtual machine is suppressed.

9. The non-transitory computer-readable storage medium of claim 8, further comprising initiating a failover operation responsive to failure of the primary virtual machine, the failover operation comprising:

receiving remaining changes that occurred to the execution state of the primary virtual machine from the first caching module until a point of failure of the primary virtual machine;

updating the state data and the virtual disk of the secondary virtual machine according to the remaining changes; and operating the secondary virtual machine in the public cloud computing system as a new primary virtual machine in place of the prior primary virtual machine.

10. The non-transitory computer-readable storage medium of claim 9, further comprising:

updating a network routing entry in a router in the private data center to redirect traffic to the secondary virtual machine in the public cloud computing system.

11. The non-transitory computer-readable storage medium of claim 9, further comprising:

dynamically updating a domain name service (DNS) to refer to the secondary virtual machine in the public cloud computing system.

12. The non-transitory computer-readable storage medium of claim 9, further comprising:

instantiating a tertiary virtual machine in the private data center, the tertiary virtual machine having an execution state corresponding to the secondary virtual machine in the public cloud computing system; and initiating a failback operation from the secondary virtual machine to the tertiary virtual machine.

13. The non-transitory computer-readable storage medium of claim 8, wherein the first caching module transmits acknowledgements to the primary virtual machine indicating that changes to the execution state of the primary virtual machine have been logged.

14. The non-transitory computer-readable storage medium of claim 8, wherein the primary virtual machine updates a virtual disk in the private data center, and the secondary virtual machine updates a second virtual disk stored in the public cloud computing system.

15. A hybrid cloud computing system comprising:

a private data center comprising a host computer executing a primary virtual machine; and a public cloud computing system configured to:

instantiate a secondary virtual machine in the public cloud computing system by creating and running the secondary virtual machine in the public cloud computing system, the secondary virtual machine having an execution state corresponding to the primary virtual machine in the private data center;

configure the secondary virtual machine to run in a virtual lockstep with the primary virtual machine;

in response to configuring the secondary virtual machine to run in a virtual lockstep with the primary virtual machine, record changes to the execution state of the primary virtual machine;

receive, at the public cloud computing system, the changes to the execution state of the primary virtual machine from a first caching module in the private data center; and update state data and a virtual disk of the instantiated secondary virtual machine according to the received changes to the execution state of the primary virtual machine, wherein at least a portion of output activity of the instantiated secondary virtual machine is suppressed.

16. The hybrid cloud computing system of claim 15, wherein the public cloud computing system is further configured to initiate a failover operation responsive to failure of the primary virtual machine, the failover operation comprising:

receiving remaining changes that occurred to the execution state of the primary virtual machine from the first caching module until a point of failure of the primary virtual machine;

updating the state data and the virtual disk of the secondary virtual machine according to the remaining changes; and operating the secondary virtual machine in the public cloud computing system as a new primary virtual machine in place of the prior primary virtual machine.

17. The hybrid cloud computing system of claim 16, wherein the public cloud computing system is further configured to:

update a network routing entry in a router in the private data center to redirect traffic to the secondary virtual machine in the public cloud computing system; and dynamically update a domain name service (DNS) to refer to the secondary virtual machine in the public cloud computing system.

18. The hybrid cloud computing system of claim 16, wherein the public cloud computing system is further configured to:

instantiate a tertiary virtual machine in the private data center, the tertiary virtual machine having an execution state corresponding to the secondary virtual machine in the public cloud computing system; and initiate a failback operation from the secondary virtual machine to the tertiary virtual machine.

19. The hybrid cloud computing system of claim 15, wherein the first caching module transmits acknowledgements to the primary virtual machine indicating that changes to the execution state of the primary virtual machine have been logged.

20. The hybrid cloud computing system of claim 15, wherein the primary virtual machine updates a virtual disk in the private data center, and the secondary virtual machine updates a second virtual disk stored in the public cloud computing system.

* * * * *